US011153576B2

(12) United States Patent
Ramasubramonian et al.

(10) Patent No.: US 11,153,576 B2
(45) Date of Patent: Oct. 19, 2021

(54) SCALING MATRICES AND SIGNALING FOR VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Vadim Seregin, San Diego, CA (US); Hilmi Enes Egilmez, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/024,551

(22) Filed: Sep. 17, 2020

(65) Prior Publication Data

US 2021/0092408 A1 Mar. 25, 2021

Related U.S. Application Data

(60) Provisional application No. 62/903,679, filed on Sep. 20, 2019, provisional application No. 62/905,873, filed on Sep. 25, 2019.

(51) Int. Cl.
*H04N 19/176* (2014.01)
*H04N 19/70* (2014.01)
(Continued)

(52) U.S. Cl.
CPC ......... *H04N 19/176* (2014.11); *H04N 19/136* (2014.11); *H04N 19/159* (2014.11);
(Continued)

(58) Field of Classification Search
CPC .... H04N 19/176; H04N 19/70; H04N 19/136; H04N 19/33; H04N 19/60; H04N 19/186;
(Continued)

(56) References Cited

U.S. PATENT DOCUMENTS 10,306,229 B2   5/2019   Zhao et al.
10,349,085 B2   7/2019   Said et al.
(Continued)

OTHER PUBLICATIONS

International Search Report and Written Opinion—PCT/US2020/051538—ISA/EPO—dated Dec. 2, 2020.
(Continued)

*Primary Examiner* — Nam D Pham
(74) *Attorney, Agent, or Firm* — Shumaker & Sieffert, P.A.

(57) ABSTRACT

An example device for coding video data includes a memory configured to store the video data and one or more processors implemented in circuitry and communicatively coupled to the memory. The one or more processors are configured to determine whether scaling matrices may be applied to a low-frequency non-separable transform (LFNST) coded block. The one or more processors are also configured to, based on a determination that scaling matrices may not be applied to the LFNST coded block, not applying the scaling matrices to the LFNST coded block. The one or more processors are also configured to code the video data without applying the scaling matrices to the LFNST coded block.

27 Claims, 12 Drawing Sheets

ENCODER

DECODER

(51) Int. Cl.
*H04N 19/136* (2014.01)
*H04N 19/33* (2014.01)
*H04N 19/60* (2014.01)
*H04N 19/186* (2014.01)
*H04N 19/159* (2014.01)

(52) U.S. Cl.
CPC ........... *H04N 19/186* (2014.11); *H04N 19/33* (2014.11); *H04N 19/60* (2014.11); *H04N 19/70* (2014.11)

(58) Field of Classification Search
CPC ...... H04N 19/159; H04N 19/18; H04N 19/61; H04N 19/122
See application file for complete search history.

(56) References Cited

U.S. PATENT DOCUMENTS

| | | | |
|---|---|---|---|
| 10,448,053 | B2 | 10/2019 | Said et al. |
| 10,491,922 | B2 | 11/2019 | Zhao et al. |
| 2008/0260278 | A1* | 10/2008 | Zuo ........................ H04N 19/48 382/251 |
| 2018/0020218 | A1 | 1/2018 | Zhao et al. |
| 2019/0297351 | A1 | 9/2019 | Said et al. |
| 2019/0373261 | A1 | 12/2019 | Egilmez et al. |

OTHER PUBLICATIONS

ITU-T H.266, Series H: Audiovisual and Multimedia Systems, Infrastructure of audiovisual services—Coding of moving video. Versatile video coding, The International Telecommunication Union, Aug. 2020, 516 pages.
Hashimoto T., "Non-CE7: Harmonization of scaling matrix and LFNST", JVET-O0383-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.
Hashimoto T., "Non-CE7: Harmonization of scaling matrix and LFNST", JVET-O0383 WD, Joint Video Experts Team (JVET) of ITU-T SG 16 WP 3 and ISO/IEC JTC 1/SC 29/WG 11, 15th Meeting: Gothenburg, SE, Jul. 3-12, 2019, 7 pages.
Ma T., "Lossless coding for VVC", JVET-O1061, Joint Video Experts Team (JVET) of ITU-T SG 16 WP 3 and ISO/IEC JTC 1/SC 29/WG 11, 15th Meeting: Gothenburg, SE, Jul. 3-12, 2019, 17 pages.
Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.
Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.
Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 51 Pages, pp. i-iv, Retrieved from the Internet: URL: http://phenix.int-evry.fr/jvet/doc_end_user/documents/7_Torino/wg11/JVET-G0001-v1.zip.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
KOO (LGE) M., et al., "CE6: Reduced Secondary Transform (RST) (CE6-3.1)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0193, Mar. 27, 2019 (Mar. 27, 2019), XP030256927, pp. 1-19, Retrieved from the Internet: URL: http://phenix.int-evry_fr/jvet/doc_end_user/documents/14_Geneva/wg11/JVET-N0193-v5.zip JVET-N0193 r3.docx, [retrieved on Mar. 27, 2019].
U.S. Appl. No. 15/931,271, filed May 13, 2020, 54 Pages.
U.S. Appl. No. 62/107,996, filed Jan. 26, 2015.
U.S. Appl. No. 62/295,440, filed Feb. 15, 2016.
U.S. Appl. No. 62/295,448, filed Feb. 15, 2016.
U.S. Appl. No. 62/295,456, filed Feb. 15, 2016.
U.S. Appl. No. 62/363,188, filed Jul. 15, 2016.
U.S. Appl. No. 62/668,105, filed May 7, 2018, 44 Pages.
U.S. Appl. No. 62/679,570, filed Jun. 1, 2018, 50 Pages.
U.S. Appl. No. 62/849,689, filed May 17, 2019, 35 Pages.
Ramasubramonian A.K., et al., "AHG15: Scaling Matrices for LFNST-Coded Blocks", JVET-P0365-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-3.

* cited by examiner

SCALING MATRICES AND SIGNALING FOR VIDEO CODING

This application claims priority to U.S. Provisional Patent Application No. 62/903,679, entitled SCALING MATRICES FOR VIDEO CODING, filed on Sep. 20, 2019, and U.S. Provisional Patent Application No. 62/905,873, SCALING MATRICES FOR VIDEO CODING, filed Sep. 25, 2019, the entire content of both of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining scaling matrices and scaling matrix signaling for video coding. Application of existing scaling matrices to low-frequency non-separable transform (LFNST) coefficients may not produce a desired effect. The techniques of this disclosure may avoid the drawbacks of using existing scaling matrices and may improve coding efficiency by, on a selective basis, not applying scaling matrices when applying the scaling matrices is undesirable.

In one example, a method includes determining whether scaling matrices may be applied to a low-frequency non-separable transform (LFNST) coded block of the video data, based on a determination that scaling matrices may not be applied to the LFNST coded block, not applying the scaling matrices to the LFNST coded block, and coding the video data without applying the scaling matrices to the LFNST coded block.

In another example, a device includes a memory configured to store the video data; and one or more processors implemented in circuitry and communicatively coupled to the memory, the one or more processors being configured to: determine whether scaling matrices may be applied to a low-frequency non-separable transform (LFNST) coded block of the video data; based on a determination that scaling matrices may not be applied to the LFNST coded block, not apply the scaling matrices to the LFNST coded block; and code the video data without applying the scaling matrices to the LFNST coded block.

In another example, a device includes means for determining whether scaling matrices may be applied to a low-frequency non-separable transform (LFNST) coded block of the video data, means for not applying the scaling matrices to the LFNST coded block based on a determination that scaling matrices may not be applied to the LFNST coded block, and means for coding the video data without applying the scaling matrices to the LFNST coded block.

In another example, a non-transitory computer-readable storage medium has instructions stored thereon which, when executed by one or more processors, cause the one or more processors to: determine whether scaling matrices may be applied to a low-frequency non-separable transform (LFNST) coded block of the video data, based on a determination that scaling matrices may not be applied to the LFNST coded block, not apply the scaling matrices to the LFNST coded block, and code the video data without applying the scaling matrices to the LFNST coded block.

The details of one or more examples are set forth in the accompanying drawings and the description below. Other features, objects, and advantages will be apparent from the description, drawings, and claims.

BRIEF DESCRIPTION OF DRAWINGS

FIG. 7 is a conceptual diagram illustrating a 4×4 inverse LFNST used to reconstruct 16 intermediate coefficients from a list of 16 input coefficients.

FIG. 8 is a conceptual diagram illustrating an 8×8 inverse LFNST used to reconstruct 48 intermediate coefficients from a list of 16 input coefficients.

DETAILED DESCRIPTION

Figure 1:
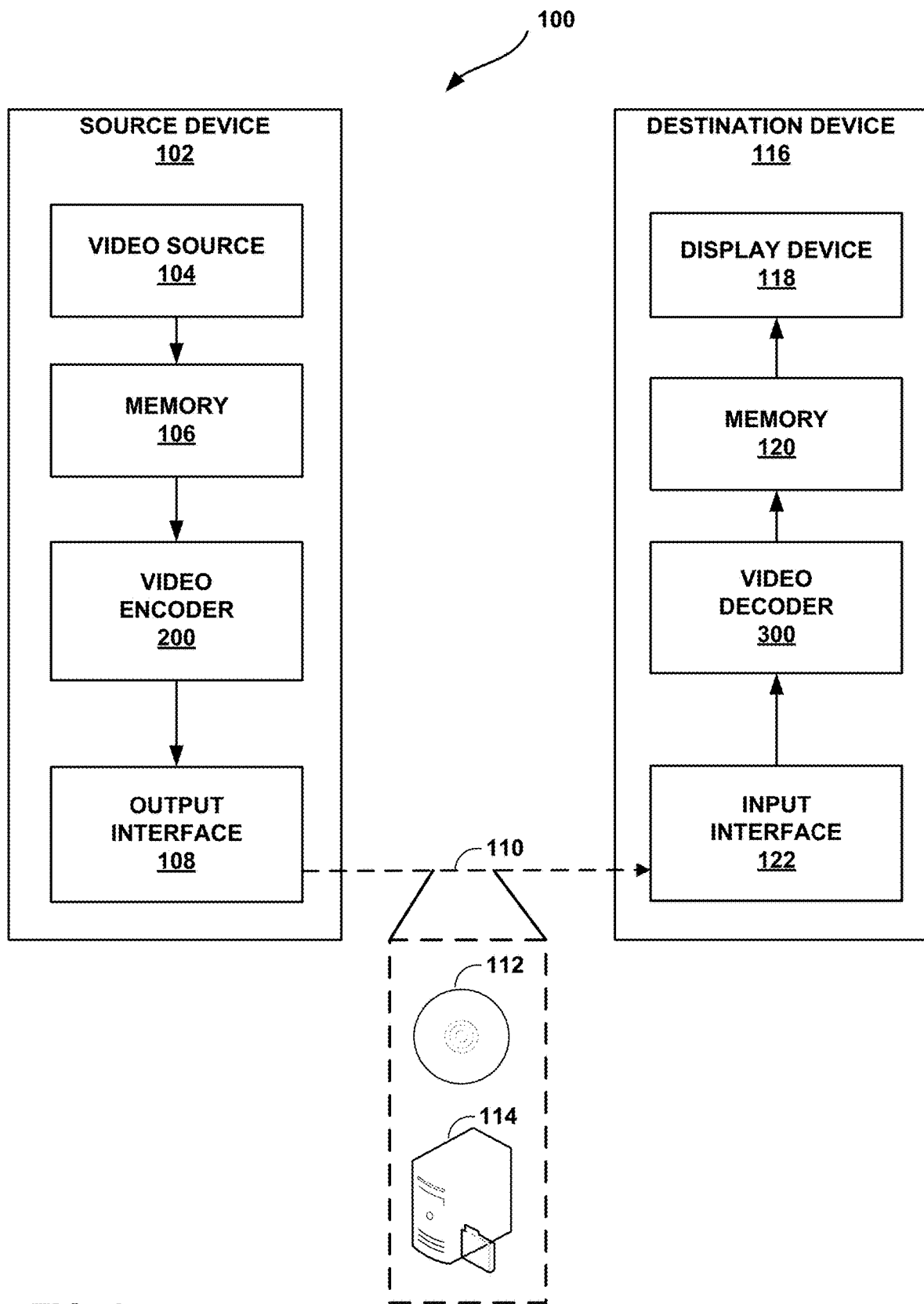
FIG. 1 is a block diagram illustrating an example video encoding and decoding system that may perform the techniques of this disclosure.

When existing scaling matrices of certain draft standards are applied to LFNST coefficients matrices, the application of the scaling matrices may not have the desired effect. For example, when video decoder 300 applies a scaling matrix associated with an M×N block to a 4×4 region of transform blocks, the relative difference in the coefficients may not result in the desired behavior. For example, if the block was an 8×8 block, the top-left 4×4 region of the block may correspond to low-frequency coefficients. The scaling matrix may be such that the low frequency coefficients are not quantized as heavily as the high frequency coefficients, resulting in a relatively flat profile of the scaling coefficients in the 4×4 region. When a block is coded with LFNST, the scaling matrix may not result in any relative scaling of coefficients due to the flat nature of the coefficients in the 4×4 region.

When the transform block is 32×32, a scaling matrix is specified on an 8×8 grid and upsampled using replication to obtain the 32×32 scaling matrix. So effectively, the top-left 4×4 region is filled with one value that corresponds to a top-left coefficient of the 8×8 grid. When such a scaling matrix is applied to a 32×32 block where LFNST is applied, the LFNST coefficients (e.g., restricted to the top-left 4×4 region) are scaled by a constant value and there is no relative scaling of the coefficients. This effectively results in a "flat" scaling matrix for the primary transform coefficients, which is contrary to the desired behavior of scaling matrices.

When LFNST is applied by a video coder, the number of LFNST coefficients that are present in the transform block may be only 8 or 16. In fixed quantization parameter coding configurations, this may result in significantly less bits used to code the block. This may create visual artifacts due to the large zeroing of coefficients and relatively smaller accuracy of the non-zero primary transform coefficients.

Additionally, when LFNST is enabled, a video encoder may have difficulty applying rate control for the LFNST-coded blocks using the scaling matrices. When rate control is enabled, application of LFNST may have to be disabled or restricted so that a more predictable rate-control behavior may be expected.

According to the techniques of this disclosure, a video encoder may determine scaling matrices and/or signal syntax elements relating to scaling matrices to avoid the drawbacks set forth above. For example, a video encoder may determine that application of scaling matrices to LFNST transform coefficients of an LFNST transform coded block is undesirable, as is discussed further below. The video encoder may determine one or more syntax elements indicative of whether scaling matrices may be applied to LFNST transform coefficients and may signal the syntax element in a bitstream. A video decoder may determine the syntax element indicative of whether scaling matrices may be applied to LFNST transform coefficients by parsing the syntax element and, based on the syntax element indicating that the scaling matrices may not be applied to the LFNST coefficients, not apply the scaling matrices to the LFNST coefficients. The video decoder may decode video data without applying the scaling matrices to the LFNST coefficients of the LFNST coded block. In this manner, a video coder may avoid the drawbacks mentioned above and may reduce processing power and improve latency by not applying the scaling matrices when not applying the scaling matrices is desirable or, conversely, when applying the scaling matrices is undesirable.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining scaling matrices and scaling matrix signaling for video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining scaling matrices and scaling matrix signaling for video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 19th Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Application of existing scaling matrices to low-frequency non-separable transform (LFNST) coefficients may not produce a desired effect. The techniques of this disclosure may avoid the drawbacks of using existing scaling matrices and may improve coding efficiency by not applying scaling matrices when applying the scaling matrices is undesirable.

In accordance with the techniques of this disclosure, a method includes determining whether scaling matrices may be applied to a low-frequency non-separable transform (LFNST) coded block of the video data, based on a determination that scaling matrices may not be applied to the LFNST coded block, not applying the scaling matrices to the LFNST coded block, and coding the video data without applying the scaling matrices to the LFNST coded block.

In accordance with the techniques of this disclosure, a device includes a memory configured to store the video data; and one or more processors implemented in circuitry and communicatively coupled to the memory, the one or more processors being configured to: determine whether scaling matrices may be applied to a low-frequency non-separable transform (LFNST) coded block of the video data; based on a determination that scaling matrices may not be applied to the LFNST coded block, not apply the scaling matrices to the LFNST coded block; and code the video data without applying the scaling matrices to the LFNST coded block.

In accordance with the techniques of this disclosure, a device includes means for determining whether scaling matrices may be applied to a low-frequency non-separable transform (LFNST) coded block of the video data, means for not applying the scaling matrices to the LFNST coded block based on a determination that scaling matrices may not be applied to the LFNST coded block, and means for coding the video data without applying the scaling matrices to the LFNST coded block.

In accordance with the techniques of this disclosure, a non-transitory computer-readable storage medium has instructions stored thereon which, when executed by one or more processors, cause the one or more processors to: determine whether scaling matrices may be applied to a low-frequency non-separable transform (LFNST) coded block of the video data; based on a determination that scaling matrices may not be applied to the LFNST coded block, not apply the scaling matrices to the LFNST coded block; and code the video data without applying the scaling matrices to the LFNST coded block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
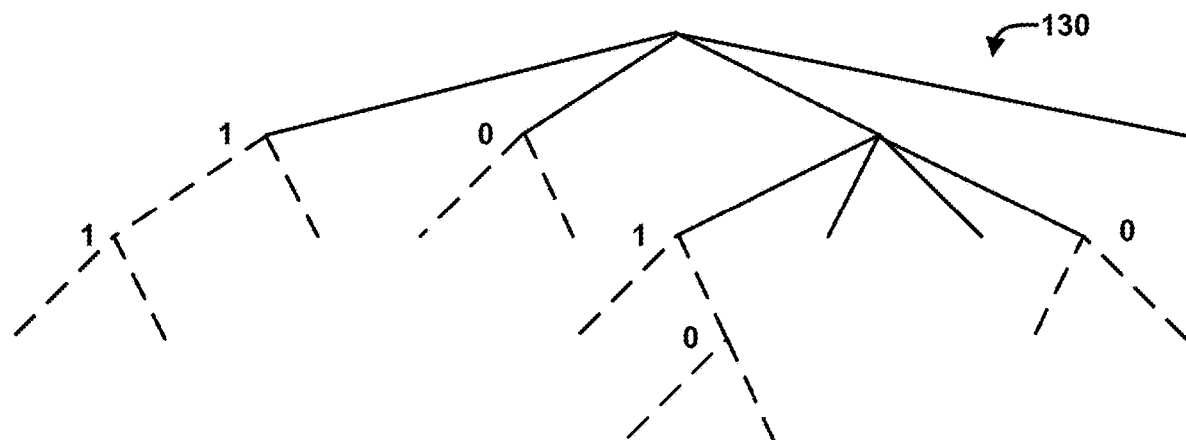
FIGS. 2A and 2B are conceptual diagrams illustrating an example quadtree binary tree (QTBT) structure, and a corresponding coding tree unit (CTU).
Figure 2B:
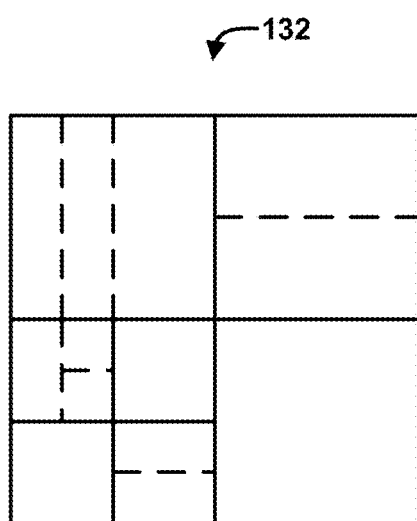

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
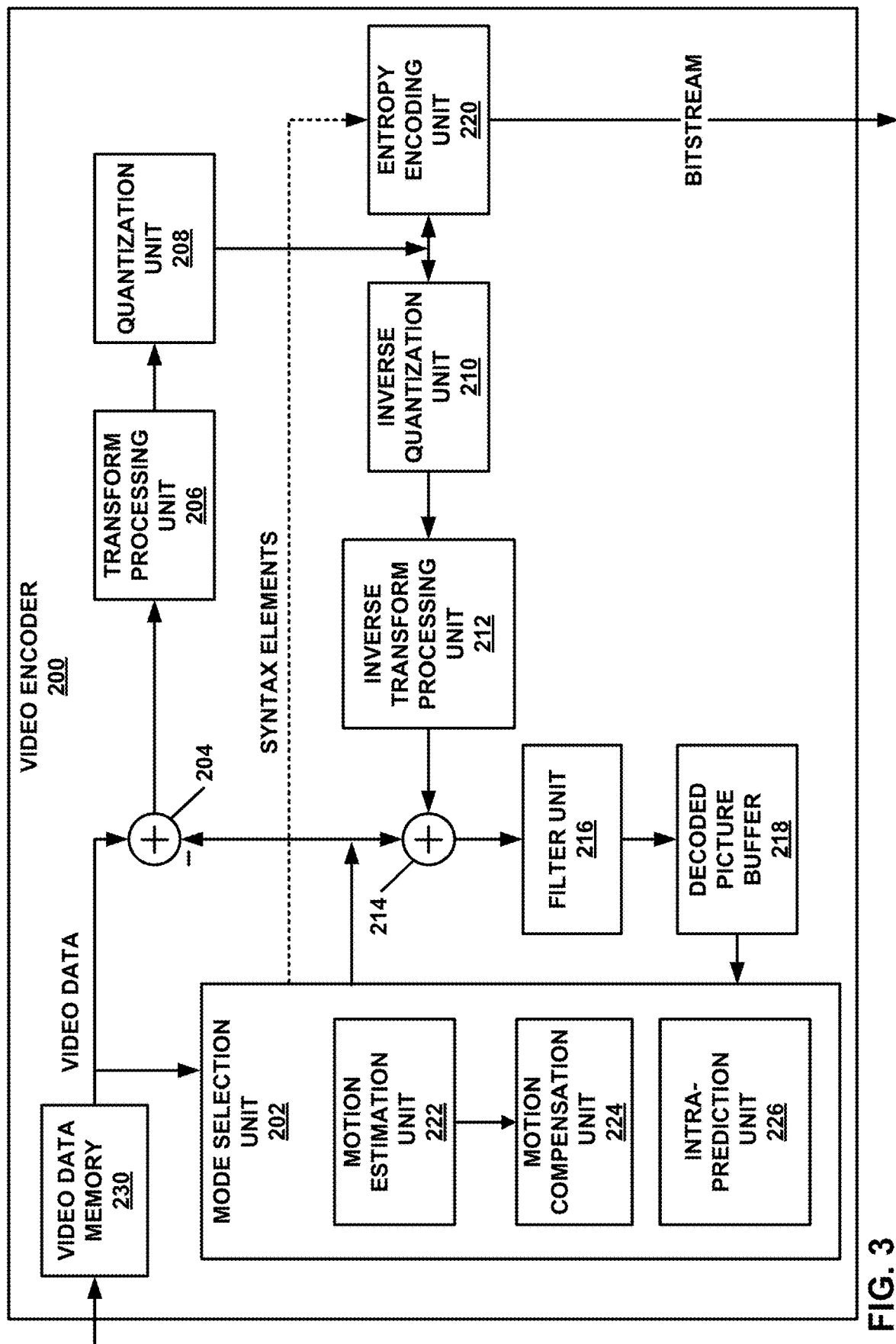
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a LFNST, a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In some examples, transform processing unit 206, quantization unit 208, inverse quantization unit 210, inverse transform processing unit 212, and/or other units of video encoder 200 may determine that application of scaling matrices to LFNST coefficients is undesirable. For example, applying a scaling matrix to LFNST coefficients may not result in any relative scaling of coefficients due to the flat nature of the coefficients, or may create visual artifacts, as is further discussed below.

Transform processing unit 206, quantization unit 208, inverse quantization unit 210, inverse transform processing unit 212, and/or other units of video encoder 200 may determine a syntax element indicative of whether scaling matrices are not to be applied to LFNST coefficients. In an example, quantization unit 208 and inverse quantization unit 210 does not apply scaling matrices to the LFNST coefficients based on the syntax element indicating that scaling matrices are not to be applied to the LFNST coefficients.

In general, entropy encoding unit 220 may entropy encode syntax elements received from other functional components of video encoder 200. For example, entropy encoding unit 220 may entropy encode a syntax element indicative of whether scaling matrices are not to be applied to LFNST coefficients. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma coding blocks, and the reference picture may be the same. As another example, the intra-prediction process may be the same for the luma coding block and the chroma coding blocks.

Video encoder 200 represents an example of a device configured to encode video data including a memory configured to store the video data, and one or more processors implemented in circuitry and communicatively coupled to the memory, the one or more processors being configured to: determine whether scaling matrices may be applied to a low-frequency non-separable transform (LFNST) coded block of the video data; based on a determination that scaling matrices may not be applied to the LFNST coded block, not apply the scaling matrices to the LFNST coded block; and encode the video data without applying the scaling matrices to the LFNST coded block.

Figure 4:
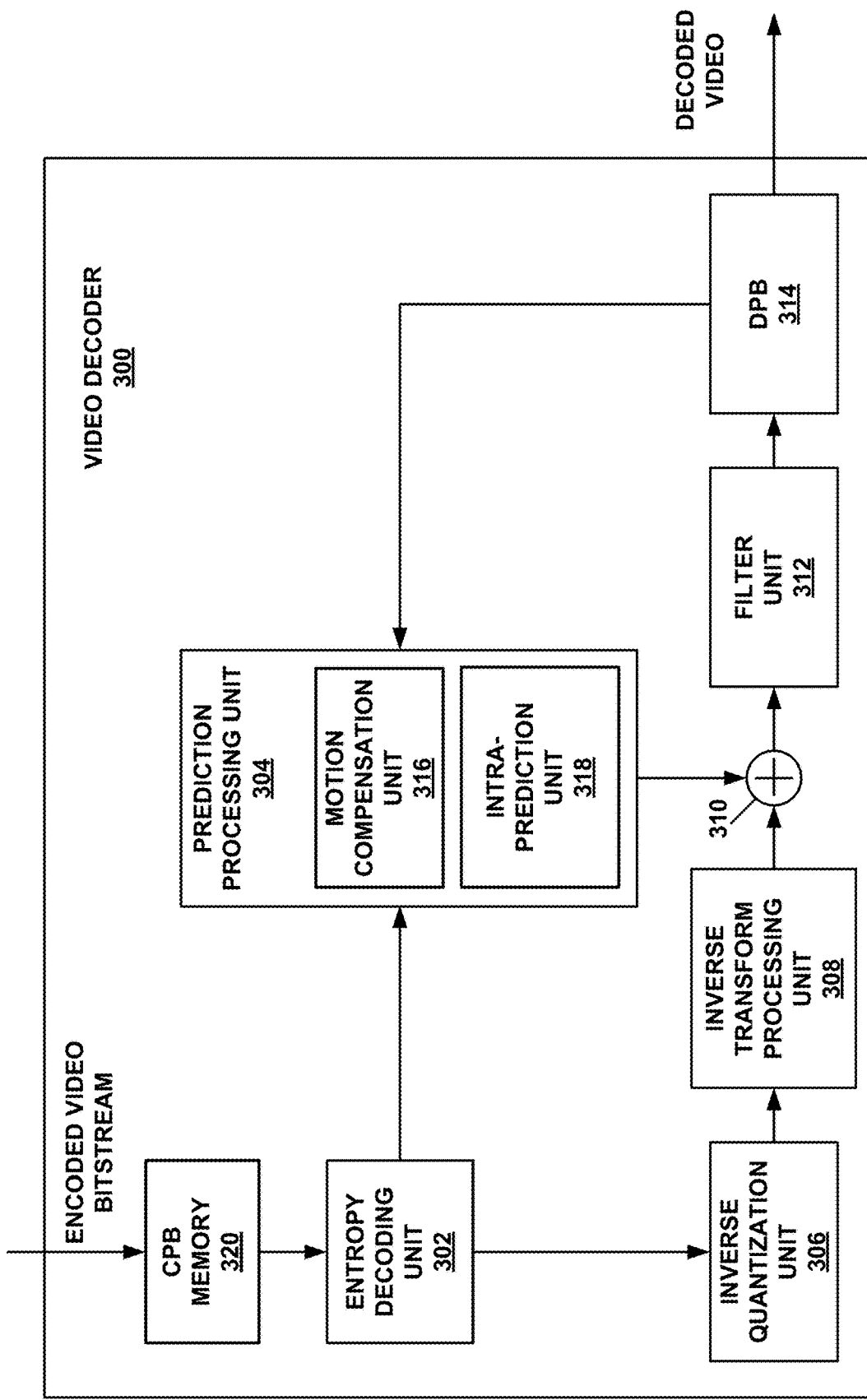
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In some examples, inverse quantization unit 306 and/or other units of video decoder 300 may determine a syntax element indicative of whether scaling matrices are not to be applied to LFNST coefficients, for example, by parsing the syntax element. In an example, inverse quantization unit 306 does not apply the scaling matrices to the LFNST coefficients based on the syntax element indicating that the scaling matrices are not to be applied to the LFNST coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data and one or more processors implemented in circuitry and communicatively coupled to the memory, the one or more processors being configured to: determine whether scaling matrices may be applied to a low-frequency non-separable transform (LFNST) coded block of the video data; based on a determination that scaling matrices may not be applied to the LFNST coded block, not apply the scaling matrices to the LFNST coded block; and decode the video data without applying the scaling matrices to the LFNST coded block.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A state-of-the-art video coding standard, namely High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (JVET), a collaborative team formed by MPEG and ITU-T Study Group 16's VCEG is working on a new video coding standard to be known as VVC. The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. The development of the VVC standard is expected to be completed in 2020.

QP values are used by video encoder 200 and video decoder 300, e.g., to determine the step size to be used for quantizing or inverse-quantizing transform coefficients. QP values are specified in the range of −QpBdOffset to 63, inclusive, where 63 is the maximum QP value. QpBdOffset is specified as a fixed value for a particular bit depth, derived as 6*(bitDepth−8). The QP prime value, calculated by adding QpBdOffset to the specified QP value, is used to derive the actual step size. For ease of description, the QP and QP prime value may be used interchangeably in the rest of this disclosure with the understanding that the QP value is used in most QP derivation processes, and the QP prime value is only used at the final stage just before determining the step size. A change of QP value by 1 roughly indicates a change in the step size by 12%; a change of QP value by 6 corresponds to a change in the step size by a factor of 2. The higher the QP value, the larger the quantization step size and the more coarse the representation of the transform coefficients that are quantized becomes.

In video coding, the residual obtained after the prediction operation is transformed using a DCT2 or other transform operation(s). Subsequently, the transform coefficients are quantized and the quantized coefficients may be entropy coded.

The quantization process of video encoder 200 or video decoder 300, e.g., is controlled by two factors: 1) QP and; 2) scaling matrices. A description of the QP has already been provided above. At the video decoder, e.g., video decoder 300, a scale factor corresponding to the QP is determined. Video decoder 300 may apply this scale factor as follows:

$$\text{levelScale}[\ ][qP \% 6]) << (qP/6)$$

where qP is the quantization parameter, levelScale[ ][ ] is an array defined as below:

The list levelScale[ ][ ] is specified as levelScale[j][k]= {{40, 45, 51, 57, 64, 72}, {57, 64, 72, 80, 90, 102}} with j=0 . . . 1, k=0 . . . 5.

A QP difference of six results in a bit-shift of 1, and hence video decoder 300 may apply the scale associated with the QP by a shift of (qP/6) and the scale may be calculated using qP % 6.

In addition, a scaling parameter may be applied for each coefficient by video encoder 200 and video decoder 300. The scaling parameter may be different for different coefficients. Video encoder 200 or video decoder 300 may determine the scaling factor associated with the scaling matrices. For example, the scaling factor may be derived from the scaling parameter. The scaling parameter may be defined with scaling lists and/or matrices. Video encoder 200 or video decoder 300 may determine an intermediate scaling factor m[x][y] as follows: If one or more of the following conditions are true, m[x][y] is set equal to 16: 1) sps_scaling_list_enabled_flag is equal to 0; or 2) transform_skip_flag [xTbY][yTbY] is equal to 1. If neither of those conditions is true, the following may apply:

$$m[x][y] = \text{ScalingFactor}[\text{Log2}(nTbW)][\text{Log2}(nTbH)][\text{matrixId}][x][y], \text{ with matrixId as specified in Table 7-5} \quad (8\text{-}958)$$

in VVC Draft 6.

Video encoder 200 or video decoder 300 may determine the final scaling factor used in the inverse quantization by multiplying the two scaling terms (from the QP and the scaling matrix) as follows: If dep_quant_enabled_flag is equal to 1, the following may apply:

$$ls[x][y] = (m[x][y] * \text{levelScale}[\text{rectNonTsFlag}][(qP+1)\%6]) << ((qP+1)/6) \quad (8\text{-}959)$$

Otherwise (dep_quant_enabled_flag is equal to 0), the following may apply:

$$ls[x][y] = (m[x][y] * \text{levelScale}[\text{rectNonTsFlag}][qP\%6]) << (qP/6) \quad (8\text{-}960)$$

The scaled transform coefficient is derived as follows and is used in the inverse quantization step. The value dnc[x][y] is derived as follows:

$$dnc[x][y] = (dz[x][y] * ls[x][y] + \text{bdOffset}) >> \text{bdShift} \quad (8\text{-}693)$$

The scaled transform coefficient d[x][y] is derived as follows:

$$d[x][y] = \text{Clip3}(\text{CoeffMin}, \text{CoeffMax}, dnc[x][y]) \quad (8\text{-}694)$$

Signaling and definition of scaling matrices are now discussed. Scaling matrices are a set of coefficients that are used by video encoder 200 and video decoder 300, e.g., to scale the transform coefficients. Video encoder 200 and/or video decoder 300 may use scaling matrices for rate control and perceptual control, which are described below.

Rate control of video is often performed by adjusting the QP values of blocks. However, the QP difference results in a uniform scale factor being applied to the entire block. Scaling matrices may be used for relative control between various coefficients within a transform block. For example, scaling matrices may be defined so that the low frequency coefficients are quantized less than the high frequency coefficients. This use of scaling matrices may be beneficial for video data where there is less high frequency content.

Scaling matrices may also be used to control the relative accuracy of coefficients within a transform block such that perceptual quality of the video is maintained with a lower bitrate. Human Visual System (HVS)-based quantization using scaling matrices may provide better quality video for certain types of content. See Sze, Budagavi and Sullivan, High Efficiency Video Coding (HEVC), Springer.

Video encoder 200 may signal the scaling matrices using scaling lists, and these scaling lists may be signaled in the adaptation parameter set (APS). The scaling list may be enabled or disabled in the SPS. If the SPS indicates that scaling lists are enabled, video encoder may further control the scaling matrices, in the slice header for example, to switch on and off the scaling matrices.

Scaling matrices may be defined for each transform block size and for the prediction type of the block. As mentioned above, the matrices may be derived from scaling lists. Video encoder 200 may use the syntax of the scaling lists signaled in the PPS and/or SPS as follows:

TABLE 1

|  | Descriptor |
|---|---|
| scaling_list_data( ) { | |
|   for( sizeId = 1; sizeId < 7; sizeId++ ) | |
|     for( matrixId = 0; matrixId < 6; matrixId ++ ) { | |
|       if( ! ( ( ( sizeId = = 1 ) && ( matrixId % 3 = = 0 ) ) \|\| | |
|         ( ( sizeId = = 6 ) && ( matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ]) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = | |
| scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !( sizeId = = 6 && x >= 4 && y >= 4) ) { | |
|               scaling_list_delta_coef | se(v) |
|               nextCoef = (nextCoef + scaling_list_delta_coef + 256 ) % 256 | |
|               ScalingList[ sizeId ][ matrixId ][ i ] = nextCoef | |

TABLE 1-continued

Descriptor

```
              }
            }
          }
        }
      }
    }
  }
}
```

The semantics of the scaling matrices are provided in Section 7.4.3.16 of VVC Draft 6. The scaling matrices, represented by the variable ScalingFactor[wId][hId][matrixId][x][y], are derived from the scaling list data. The wId and hId refer to the sizeID variable representing the size of the transform block. The sizeId (Table 2) and matrixId (Table 3) are set forth in the following tables:

TABLE 2

| Size of quantization matrix | sizeId |
| --- | --- |
| 1 × 1 | 0 |
| 2 × 2 | 1 |
| 4 × 4 | 2 |
| 8 × 8 | 3 |
| 16 × 16 | 4 |
| 32 × 32 | 5 |
| 64 × 64 | 6 |

TABLE 3

| sizeId | CuPredMode | cIdx (Color component) | matrixId |
| --- | --- | --- | --- |
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |

In Table 3, matrixId is specified based on sizeId, prediction mode and color component.

Some notable features of the scaling matrices and their derivation are now discussed. Scaling matrices are specified separately for each of the three color components and two prediction types, inter-prediction and IBC, are treated together as one prediction type, and intra prediction is treated as another prediction type.

The scaling lists (and thus the derived matrices) are specified for the square TBs. For rectangular TBs, the scaling matrices are derived from the scaling matrix of a corresponding square TB.

For 16×16, 32×32 and 64×64 scaling matrices, only 64 coefficients are specified as an 8×8 grid, and the matrix coefficients for larger blocks are obtained by upsampling the coefficients to the desired size. In such cases, video encoder 200 also signals a DC coefficient.

Scaling matrices of a particular sizeID may be predicted from other scaling matrices of the same sizeID. The prediction in this case is a copy of the reference matrix. When the DC coefficient is also signaled for a particular sizeID, the DC coefficient is copied from the DC coefficient of the reference matrix.

In video coding standards prior to HEVC, only a fixed separable transform was used where DCT-2 was used both vertically and horizontally. In HEVC, in addition to DCT-2, DST-7 is also employed for 4×4 blocks as a fixed separable transform.

U.S. Pat. No. 10,306,229, entitled Enhanced Multiple Transforms for Prediction Residual, issued on May 28, 2019 and claiming priority to U.S. Provisional Patent Application 62/107,996 filed on Jan. 26, 2015; U.S. Publication No. 2018-0020218 A1 entitled Look-Up Table for Enhanced Multiple Transform, published on Jan. 18, 2018 and claiming priority to U.S. Provisional Patent Application No. 62/363,188 filed on Jul. 15, 2016; and U.S. Patent Publication No. 2019-0373261 A1 entitled Coding Adaptive Multiple Transform Information for Video Coding, filed on May 30, 2019 and claiming priority to U.S. Provisional Patent Application No. 62/679,570 filed on Jun. 1, 2018, cover multiple transform selection (MTS) methods. MTS was previously called Adaptive Multiple Transforms (AMT). An example of MTS in U.S. Patent Publication No. 2019-0373261 A1 has been adopted in the Joint Experimental Model (JEM-7.0) of the Joint Video Experts Team (JVET), and later a simplified version of MTS is adopted in VVC.

Figure 5:
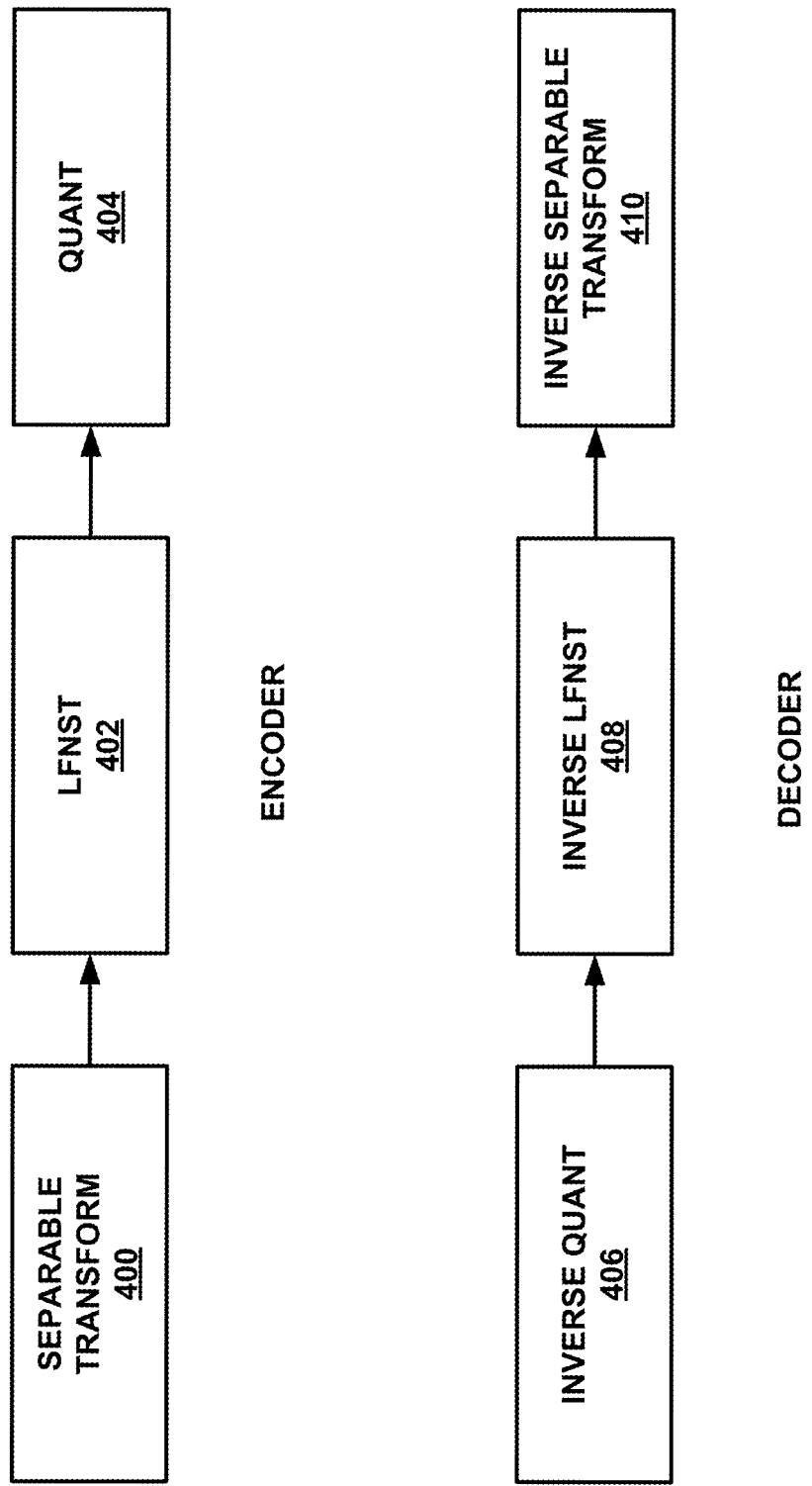
FIG. 5 is a conceptual diagram illustrating a low-frequency non-separable transform (LFNST) in an encoder and a decoder.

FIG. 5 is a conceptual diagram illustrating a low-frequency non-separable transform (LFNST) in an encoder and decoder (e.g., video encoder 200 and video decoder 300). In the example of FIG. 5, a video encoder, such as video encoder 200, may apply a separable transform 400. The video encoder may then apply an LFNST 402. The video encoder may then quantize the LFNST coefficients 404. A video decoder, such as video decoder 300, may inverse quantize the quantized coefficients 406. The video decoder may then apply an inverse LFNST 408. The video decoder may then apply an inverse separable transform 410.

The LFNST illustrated in FIG. 5 is used in JEM-7.0 to further improve the coding efficiency of MTS, where an implementation of LFNST is based on a Hypercube Givens Transform (HyGT) disclosed in U.S. Pat. No. 10,448,053, entitled Multi-Pass Non-Separable Transforms for Video Coding, issued on Oct. 15, 2019 and claiming the benefit of U.S. Provisional Patent Application Nos. 62/295,440 and 62/295,448 both filed on Feb. 15, 2016 (for alternative designs and further details, see U.S. Pat. No. 10,491,922, entitled Non-Separable Secondary Transform for Video Coding, issued on Nov. 26, 2019; U.S. Pat. No. 10,349,085, entitled Efficient Parameter Storage for Compact Multi-Pass Transforms, issued on Jul. 9, 2019, and claiming the benefit of U.S. Provisional Patent Application Nos. 62/295,456 and 62/295,448 both filed on Feb. 15, 2016, and U.S. Patent Publication No. 2019-0297351 A1, entitled Minimization of Transform Memory and Latency Via Parallel Factorizations, published on Sep. 26, 2019). LFNST was previously called non-separable secondary transform (NSST) or secondary transform where all the abbreviations are the same. Recently, LFNST has been adopted in Koo et al., "CE6: Reduced Secondary Transform (RST) (CE6-3.1)" Joint Video Experts Team (JVET) of ITU-T SG 16 WP 3 and ISO/IEC JTC 1/SC 29/WG 11, 14th Meeting: Geneva, CH, 19-27 Mar. 2019, JVET-N0193.

Figure 6:
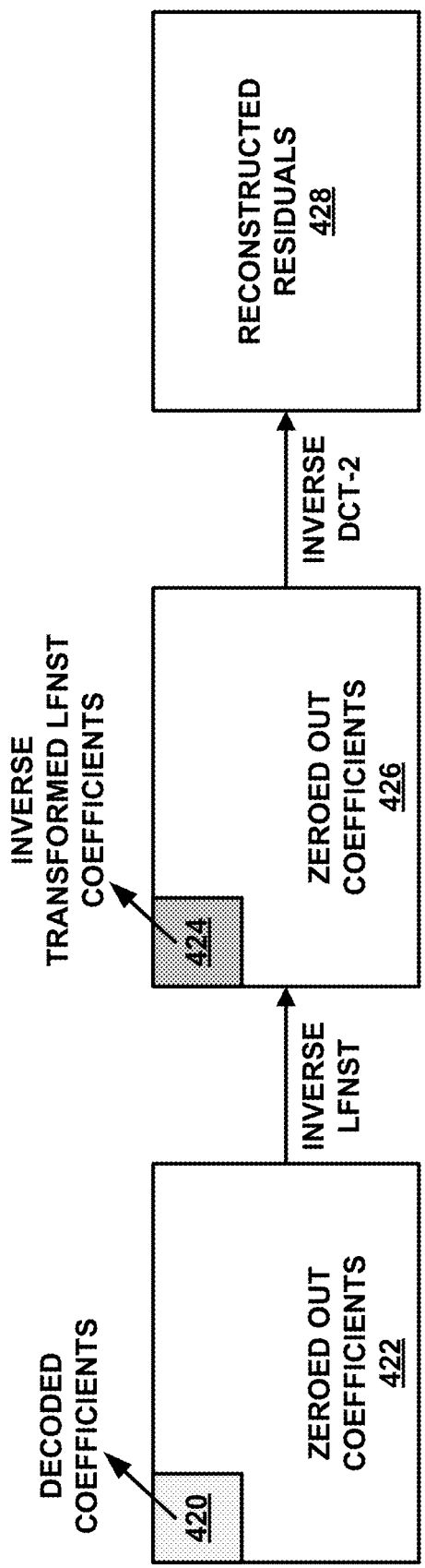
FIG. 6 is a conceptual diagram illustrating an inverse transform process with LFNST.

FIG. 6 is a conceptual diagram illustrating an example inverse transform process with LFNST. The inverse transformation with LFNST involves the following techniques illustrated in FIG. 6 and may be performed, for example, by inverse transform processing unit 212 of video encoder 200 and by inverse transform processing unit 308 of video decoder 300. The decoded transform coefficients in 2-D block 420 are used as input to the inverse LFNST by first converting 2-D block 420 into a 1-D list (or vector) of coefficients via a pre-defined scanning or ordering. Zeroed out coefficients 422 are not used. Zeroed out coefficients may be coefficients whose values are set to zero based on their position within the 2-D block according to predefined rules. An inverse LFNST is applied to the 1-D list of input coefficients and the output coefficients are reorganized into 2-D block 424 via a pre-defined scanning or ordering. Zeroed out coefficients 426 are not used. The inverse transformed LFNST coefficients are used as input to the separable inverse DCT-2 to obtain reconstructed residuals 428.

Figure 7:
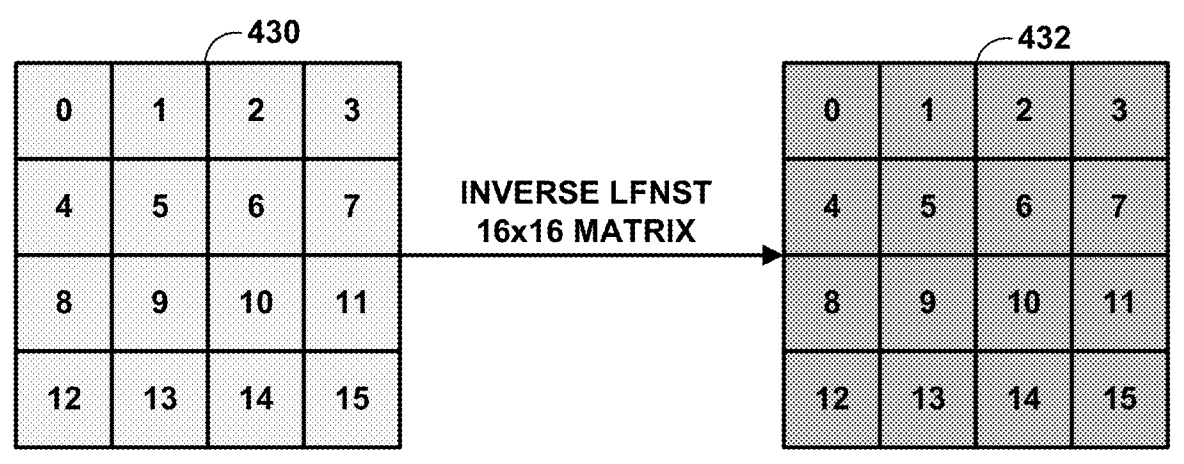
Figure 8:
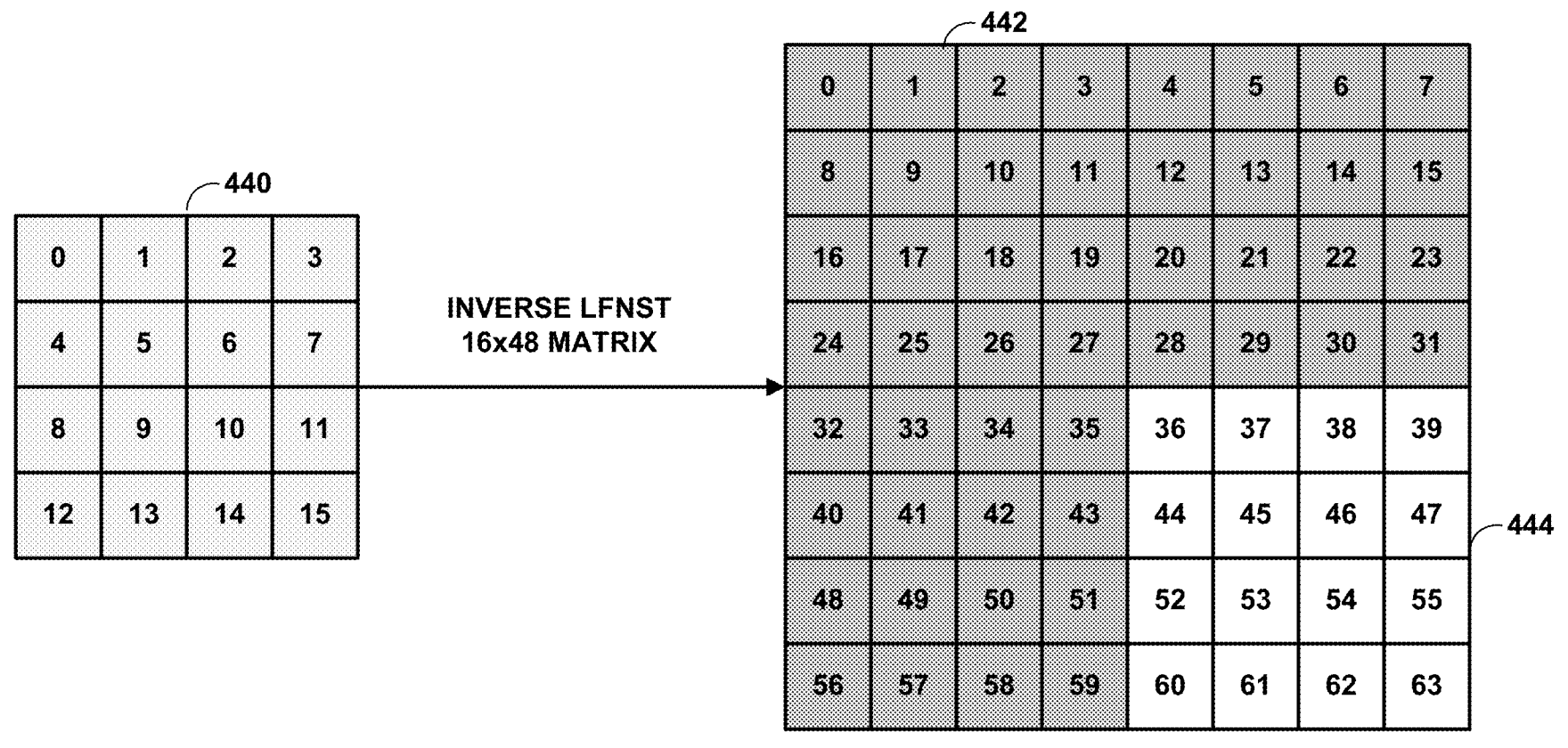

FIG. 7 is a conceptual diagram illustrating a 4×4 inverse LFNST used to reconstruct 16 intermediate coefficients from a list of 16 input coefficients. FIG. 8 is a conceptual diagram illustrating an 8×8 inverse LFNST used to reconstruct 48 intermediate coefficients from a list of 16 input coefficients.

In VVC Draft 6, LFNST may be applied to 4×4 or 8×8 subblocks. In both cases, 16 decoded coefficients in a 4×4 subblock (some of which may be normatively zeroed-out) are input to an inverse LFNST. For 4×4 subblock 430, video decoder 300 may use a 16×16 inverse LFNST to construct 16 intermediate coefficients 432, as shown in FIG. 7, before applying the separable inverse DCT-2. For 8×8 subblock 440, video decoder 300 may use a 16×48 inverse LFNST to construct 48 intermediate coefficients 442, as shown in FIG. 8, before the separable inverse DCT-2. Note that 48 intermediate coefficients 442 are reorganized in an L-shaped pattern. The remaining coefficients 444, which are shown as unshaded, are zeroed out. An inverse LFNST process may be fully defined based on (i) a transform (e.g., LFNST) matrix and (ii) a reorganization pattern or scan for intermediate coefficients. One example of the details of the zero-out process in VVC Draft 6 is described in U.S. patent application Ser. No. 15/931,271, entitled Low-Frequency Non-Separable Transformation Signaling Based on Zero-Out Patterns for Video Coding, filed on May 13, 2020 and claiming priority to U.S. Provisional Patent Application 62/849,689, filed May 17, 2019.

For a 4×4 LFNST, one of the following two patterns/scans is used depending on intra mode:

```
const int g_lfnstRGScan4x4 [16] =
{ // 1 0 1 2 3 4 5 6 7 8 9 10 11 12 13 14 15
    0, 1, 2, 3, 4, 5, 6, 7, 8, 9, 10, 11, 12, 13, 14, 15
};
const int g_lfnstRGTranScan4x4[16] =
{ // 0 1 2 3 4 5 6 7 8 9 10 11 12 13 14 15
    0, 4, 8,12, 1, 5, 9, 13, 2, 6, 10, 14, 3, 7, 11, 15
};
``` where the above two patterns/scans indicate the reordering of intermediate coefficients. For example, g_lfnstRGScan4×4 does not change the row-major reordering of coefficients. However, g_lfnstRGTranScan4×4 reorders by transposing the order of coefficients (e.g., coefficients at 1, 2, 3, 6, 7 and 11 are swapped with coefficients at 4, 8, 12, 9, 13 and 14, respectively). In some examples, g_lfnstRGScan4×4 may be used for intra modes indexed between 0 and 34, inclusive and g_lfnstRGTranScan4×4 may be used for intra modes indexed above 34.

For 4×4 LFNST, the eight 16×16 matrices are used as candidates according to Section 8.7.4.3 of VVC Draft 6.

For an 8×8 LFNST, one of the following two patterns/scans are used depending on intra mode:

```
const int g_lfnstRGScan8x8 [48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
    0, 1, 2, 3, 4, 5, 6, 7, 8, 9, 10, 11, 12, 13, 14, 15, 16, 17, 18, 19, 20, 21, 22, 23,
24, 25, 26, 27, 28, 29, 30, 31, 32, 33, 34, 35, 40, 41, 42, 43, 48, 49, 50, 51, 56, 57, 58,
59
};
const int g_lfnstRGTranScan8x8[48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
    0, 8, 16, 24, 32, 40, 48, 56, 1, 9, 17, 25, 33, 41, 49, 57, 2, 10, 18, 26, 34, 42, 50,
58, 3, 11, 19, 27, 35, 43, 51, 59, 4, 12, 20, 28, 5, 13, 21, 29, 6, 14, 22, 30, 7, 15, 23,
31
};
``` where the above two patterns/scans indicate the reordering of intermediate coefficients. Specifically, g_lfnstRGScan8×8 reorganizes 48 intermediate coefficients in the L-shaped pattern (e.g., the 48th coefficient is mapped to location 59 in FIG. 8). The scan g_lfnstRGTranScan8×8 reorders the L-shaped pattern by transposing coefficients (e.g., the 48th coefficient is mapped to location 31 in FIG. 8). In some examples, g_lfnstRGScan4×4 may be used for intra modes indexed between 0 and 34, inclusive and g_lfnstRGTranScan4×4 may be used for intra modes indexed above 34. For 8×8 LFNST, eight 16×48 matrices are used as candidates according to Section 8.7.4.3 of VVC Draft 6.

Figure 9:
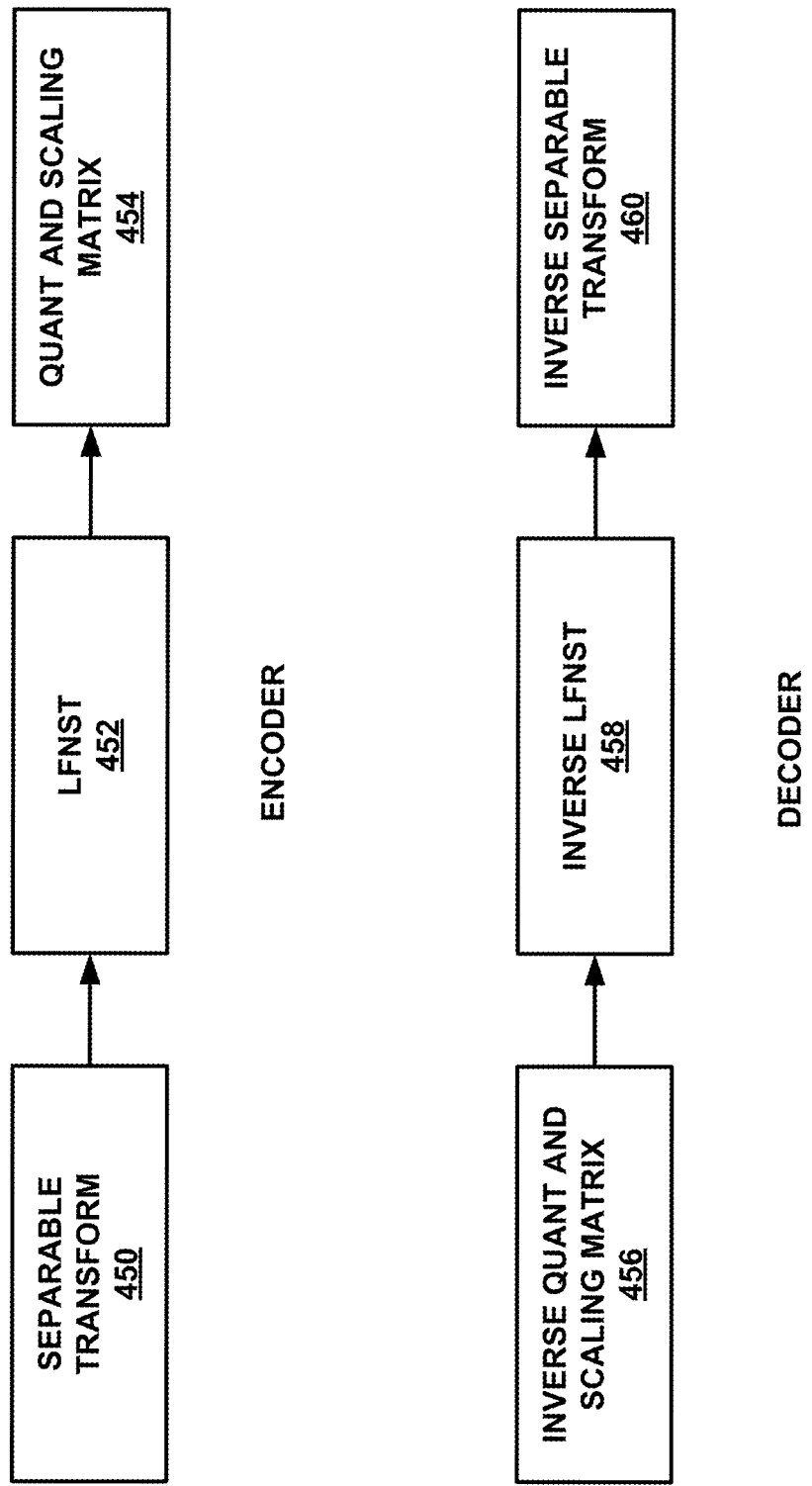
FIG. 9 is a conceptual diagram illustrating an LFNST and a scaling matrix in an encoder and a decoder.

FIG. 9 is a conceptual diagram illustrating an LFNST and a scaling matrix in an encoder and a decoder. In the example of FIG. 9, a video encoder, such as video encoder 200, may apply a separable transform 450. The video encoder may then apply an LFNST 452. The video encoder may then quantize the LFNST coefficients and apply a scaling matrix 454. A video decoder, such as video decoder 300, may inverse quantize the quantized coefficients and apply a scaling matrix 456. The video decoder may then apply an inverse LFNST 458. The video decoder may then apply an inverse separable transform 460.

The scaling matrices are defined for various transform block sizes. When a transform block has a size M×N, video decoder 300 applies the scaling matrix corresponding to the block size in the inverse quantization step as follows. When LFNST is applied, each block only contains 8 or 16 LFNST coefficients. Since LFNST is a non-separable transform, these coefficients are one-dimensional. However, the coefficients may be arranged in the diagonal scan order computed with the top-left 4×4 region of the transform block. Scaling matrices are typically defined for the primary transform coefficients. In VVC Draft 6, when scaling matrices are applied, the scaling matrix applicable to the M×N block is applied directly on the LFNST coefficients.

Although applying the scaling matrices to the LFNST coefficients matrices may not crash the decoder, such an application may not have the desired effect. For example, when video decoder 300 applies a scaling matrix associated with an M×N block to the 4×4 region of transform blocks, the relative difference in the coefficients may not result in the desired behavior. For example, if the block was an 8×8 block, the top-left 4×4 region of the block may correspond to low-frequency coefficients. The scaling matrix may be such that the low frequency coefficients are not quantized as heavily as the high frequency coefficients, resulting in a relatively flat profile of the scaling coefficients in the 4×4 region. When a block is coded with LFNST, the scaling matrix may not result in any relative scaling of coefficients due to the flat nature of the coefficients in the 4×4 region.

When the transform block is 32×32, a scaling matrix is specified on an 8×8 grid and upsampled using replication to obtain the 32×32 scaling matrix. So effectively, the top-left 4×4 region is filled with one value that corresponds to a top-left coefficient of the 8×8 grid. When such a scaling matrix is applied to a 32×32 block where LFNST is applied, the LFNST coefficients (e.g., restricted to the top-left 4×4 region) are scaled by a constant value and there is no relative scaling of the coefficients. This effectively results in a "flat" scaling matrix for the primary transform coefficients which is contrary to the desired behavior of scaling matrices.

When LFNST is applied by video encoder 200 or video decoder 300, the number of LFNST coefficients that are present in the transform block is only 8 or 16. In fixed QP coding configurations, this may result in significantly less bits used to code the block. This may create visual artifacts due to the large zeroing of coefficients and relatively smaller accuracy of the non-zero primary transform coefficients.

A scaling matrix design that works well for transform blocks coded with LFNST is desirable. However, with the scaling matrix design of VVC Draft 6, one of the following scenarios is likely: 1) when LFNST is enabled, video encoder 200 may have difficulty applying rate control for the LFNST-coded blocks using the scaling matrices; or 2) when rate control is enabled, application of LFNST may be disabled or restricted so that a more predictable rate-control behavior may be expected.

This disclosure describes several techniques that may improve the chroma QP derivation for hybrid transform-based video codecs, including signaling techniques. One or more of these techniques may be used independently, or in combination with other techniques. For an M×N transform block, for which LFNST with index lfnstIdx is applied, where nZ is the number of non-zero LFNST coefficients, where nZ coefficients may be arranged in an M1×N1 region of the transform block, several techniques are disclosed.

In some examples, video encoder 200 or video decoder 300 may apply a scaling matrix corresponding to the M1×N1 transform block to the LFNST coefficients (e.g., instead of the scaling matrix corresponding to the M×N block). In some examples, the scaling matrix corresponding to a block size of M2×N2 may be applied, where only the top-left M1×N1 coefficients are applied to the LFNST coefficients. For example, for an LFNST with 16 coefficients, the top-left 4×4 coefficients of the scaling matrix corresponding to the 8×8 block may be applied.

In some examples, when video encoder 200 or video decoder 300 obtain the scaling matrix for the M×N block by upscaling using a K1×K2 scaling matrix that was originally used before the upscaling, the following may apply. If M1 is not greater than K1 and N1 is not greater than K2, the top-left M1×N1 samples of the K1×K2 matrix may be applied to the LFNST coefficients. In this case, no upsampling of the scaling matrix coefficients may be applied. For example, if M=N=32, M1=N1=4, K1=K2=8, then the for block, only the top-left 4×4 samples of the 8×8 original scaling matrix coefficients may be used as the scaling matrix. When one or both of M1 and N1 is greater than K1 and K2, respectively, then upscaling may be applied only to the dimension(s) that is (are) greater.

In some examples, video encoder 200 or video decoder 300 may apply a first QP-offset-LFNST to code the transform block. The first QP offset may be implicit or inferred to be equal to a value. For example, when LFNST is applied, the QP offset of −1 may be added resulting in a lower QP or finer quantization of the coefficients for the transform block. In some alternatives, the first QP offset may be dependent on the block size. For larger blocks, the first QP offset may be larger in magnitude than for smaller blocks. In some examples, other characteristics of the block, including but not limited to intra mode, primary transform used, prediction modes used, QP value, etc., may be used to determine the QP offset to be applied to an LFNST block. In some examples, video encoder 200 may signal the first QP offset value in the bitstream. In some examples, video decoder 300 may derive the first QP offset value. In one alternative example, the QP offset may be obtained as a function of the QP for the block, lfnstIdx and intra mode. Video encoder 200 or video decoder 300 may apply the function as a function or may apply the function through the use of a look-up table.

In some examples, video encoder 200 or video decoder 300 may apply a scaling vector of size nZ for the LFNST blocks. This scaling vector may be applied to the LFNST coefficients in lieu of the LFNST matrices. Alternatively, video encoder 200 may signal an M1×N1 matrix that contains the scaling coefficients to be applied when LFNST is specified for an LFNST block. In another example, different scaling vectors/matrices may be specified for different block sizes for which LFNST is applied. Different vectors/matrices may also be applied depending on other characteristics of the block (e.g., intra mode, lfnstIdx, prediction mode, etc.)

In some examples, video encoder 200 or video decoder 300 may predict the scaling vector/matrix specified for LFNST blocks from other scaling matrices specified. Alternatively, other scaling matrices may be predicted from scaling vector/matrix specified for LFNST.

In some examples, video decoder 300 may infer the scaling factor for one or more coefficients in the matrix that is not specified by one of the techniques above to be equal to 0.

In some examples, a flag may be signaled or derived to specify that scaling matrices may not be applied to LFNST-coded blocks. Video encoder 200 may signal this flag in one or more of the parameter sets (e.g., SPS, PPS, APS, etc.) of the bitstream or video decoder 300 may infer the flag through other means. In some examples, the flag may be further configured to restrict the application of scaling matrices for LFNST blocks only under certain criteria. For example, one of more of the criteria may be dependent on the block characteristics, such as block width/height/aspect ratio, prediction mode used, component, primary transform applied, etc. More generally, for a tool used to code the video, a flag may be signaled or derived to specify that the scaling matrices may not be applied to blocks coded with that particular tool, or the tool with certain parameters. For example, scaling matrices may not be applied when the block is coded with a primary transform with a non-DCT2 kernel.

In some examples, some of the techniques disclosed above may also apply to the primary transform coefficients. For example, when the primary transform coefficients are restricted to a region smaller than the block size (e.g., due to zero out), one or more of the above techniques may be utilized to derive the scaling matrices that are to be applied.

One or more techniques disclosed herein may further be constrained by one or more characteristics of the samples on which the chroma mapping table is applied, e.g., block shape, aspect ratio, prediction mode used, characteristics of the neighboring block, location of the samples with respect to the picture (near the boundaries or away from the boundaries, including picture boundaries, tile boundaries, slice boundaries, brick boundaries, etc.).

Some techniques described above may be applied at an encoder or decoder, or both. Although many of the techniques disclosed are for chroma components, they may also be applicable for luma and for components in other color spaces that may be used to represent the video data. One or more techniques may be applied together or applied independently.

For blocks that have LFNST enabled, the scaling matrix corresponding to the 4×4 transform block size may be applied. The following changes may be made to the scaling process of transform coefficients in Section 8.7.3 of VVC Draft 6. Additions are shown in between <ADD> and </ADD> and deletions are shown between <DELETE> and </DELETE>.

The list levelScale[ ][ ] is specified as levelScale[j][k]={ {40, 45, 51, 57, 64, 72}, {57, 64, 72, 80, 90, 102} } with j=0 . . . 1, k=0 . . . 5.

The (nTbW)×(nTbH) array dz is set equal to the (nTbW)×(nTbH) array TransCoeffLevel[xTbY][yTbY][cIdx].

For the derivation of the scaled transform coefficients d[x][y] with x=0 . . . nTbW 1, y=0 . . . nTbH 1, the following applies:

The intermediate scaling factor m[x][y] is derived as follows:
If one or more of the following conditions are true, m[x][y] is set equal to 16:

sps_scaling_list_enabled_flag is equal to 0.
transform_skip_flag[xTbY][yTbY] is equal to 1.
Otherwise, the following applies:

```
<ADD> if( lfnst_idx[ xTbY ][ yTbY ] != 0)
  scW = 4
  swH = 4
else
  scW = nTbW
  scH = nTbH </ADD>
m[ x ][ y ] = ScalingFactor[ Log2( <ADD> scW </ADD> <DELETE> nTbW </DELETE>) ][ Log2( <ADD> scH </ADD> <DELETE> nTbH </DELETE> ) ][ matrixId ][ x ][ y ],
``` with matrixId as specified in Table 7-5
(8-958) [in VVC Draft 6]
The scaling factor ls[x][y] is derived as follows:
. . .

In some examples, for different blocks sizes, the LFNST coefficients may be different. For example, the values scW and scH may be dependent on block size nTbW, nTbH and lfnstIdx when LFNST is enabled. For example, for block sizes 64×64, the number of coefficients may be restricted within an 8×8 region instead of a 4×4 region. In this case, scW and scH may be set to 8 instead of 4.

In some examples, video encoder 200 or video decoder 300 may apply an implicit QP offset of −1 to all LFNST blocks. The following changes may be made to the scaling process of transform coefficients in Section 8.7.3 of VVC Draft 6. Additions are shown between <ADD> and </ADD>.

Scaling Process for Transform Coefficients
. . .

The scaling factor ls[x][y] is derived as follows:

<ADD>—The variable qPFinal is set equal to (lfnstIdx[xTbY][yTbY]!=0)?qP−1:qP</ADD>

If dep_quant_enabled_flag is equal to 1, the following applies:

ls[x][y]=(m[x][y]*levelScale[rectNonTsFlag][(qP<ADD>Final </ADD>+1)%6])<<((qP<ADD>Final </ADD>+1)/6)  (8-959)

Otherwise (dep_quant_enabled_flag is equal to 0), the following applies:

ls[x][y=](m[x][y]*levelScale[rectNonTsFlag][(qP<ADD>Final </ADD>%6])<<(qP<ADD>Final </ADD>/6)  (8-960)

In some alternatives, the implicit QP may not be applied to all the color components. For example, implicit QP may only be applied to the luma component and not applied to the chroma component.

In one example, video encoder 200 may signal a flag in the APS or scaling_list_data syntax structure to specify whether scaling matrices may be applied to the LFNST-coded blocks. In some examples, when scaling matrices are applied, the scaling matrix corresponding to the 4×4 transform block size may be applied for the given matrixID value (i.e., prediction type and component). The changes to VVC Draft 6 are indicated below. Additions are shown between <ADD> and </ADD> and deletions are shown between <DELETE> and </DELETE>.

TABLE 4

|  | Descriptor |
|---|---|
| scaling_list_data( ) { | |
|     <ADD> scaling_matrix_for_1fnst_disable_flag </ADD> | <ADD>u(1)</ADD> |
|     for( sizeId = 1; sizeId < 7; sizeId++ ) | |
|         for( matrixId = 0; matrixId < 6; matrixId ++ ) { | |
|             if( ! ( ( ( sizeId = = 1 ) && ( matrixId % 3 = = 0 ) ) \|\| | |
|               ( ( sizeId = = 6 ) && ( matrixId % 3 != 0 ) ) ) ) { | |

<ADD> scaling_matrix_for_lfnst_disable_flag equal to 1 specifies that scaling matrices are not applied to blocks coded with LFNST.
Scaling_matrix_for_lfnst_disable_flag equal to 0 specifies that the scaling matrices may apply to the blocks coded with LFNST. </ADD>

The following changes are made to the Section 8.7.3 scaling process for transform coefficients.
For the derivation of the scaled transform coefficients d[x][y] with x=0 . . . nTbW−1, y=0 . . . nTbH−1, the following applies:
. . .
The intermediate scaling factor m[x][y] is derived as follows:
If one or more of the following conditions are true, m[x][y] is set equal to 16:
    sps_scaling_list_enabled_flag is equal to 0.
    transform_skip_flag[xTbY][yTbY] is equal to 1.
    <ADD> scaling_matrix_for_lfnst_disable_flag is equal to 1 and lfnst_idx[xTbY][yTbY] is not equal to 0
    All of the following conditions are true:
    scaling_matrix_for_lfnst_disable_flag is equal to 0
    lfnst_idx[xTbY][yTbY] is not equal to 0
    x is greater than or equal to 4
    y is greater than or equal to 4</ADD>
Otherwise, the following applies:
    <ADD> scW=(lfnst_idx[xTbY][yTbY] !=0) ? 4: nTbW scH=(lfnst_idx[xTbY][yTbY] !=0) ? 4: nTbH </ADD>>m[x][y]=ScalingFactor[Log 2(<DELETE> nTbsc </DELETE> W)][Log 2(<DELETE> nTbsc </DELETE> H)][matrixId][x][y], with matrixId as specified in Table 7 (8-958) [in WC Draft 6]
The scaling factor ls[x][y] is derived as follows:
. . .

Figure 10:
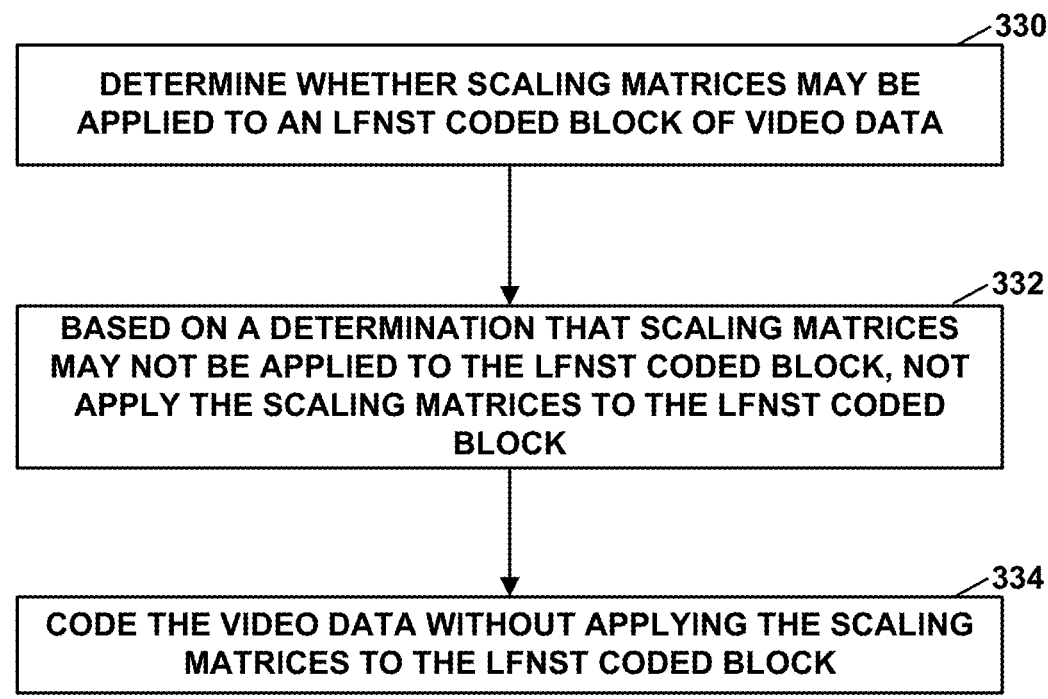
FIG. 10 is a flowchart illustrating scaling matrix signaling techniques according to this disclosure.

FIG. 10 is a flowchart illustrating example scaling matrix signaling techniques according to this disclosure. Video encoder 200 or video decoder 300 may determine a whether scaling matrices may be applied to a LFNST coded block of video data (330). For example, video encoder 200 may determine that scaling matrices should not be used for an LFNST coded block. Video encoder 200 may process+a syntax element indicative of whether scaling matrices may be to be applied to an LFNST coded block by generating the syntax element and may signal the syntax element in a bitstream indicating whether the scaling matrices may be applied to an LFNST coded block. Video encoder 200 may signal the syntax element in an SPS, PPS, or APS. Video encoder 200 may signal the syntax element in a scaling list data syntax structure in the bitstream. Video decoder 300 determine whether the scaling matrices may be applied to the LFNST coded block based on the syntax element received within one of an SPS, PPS, or APS. For example, video decoder 300 may parse the syntax element. In some examples, video decoder 300 may derive a value indicative of whether scaling matrices may be applied to the LFNST coded block.

Based on a determination that scaling matrices may not be applied to the LFNST coded block, video encoder 200 or video decoder 300 may not apply the scaling matrices to the LFNST coded block (332). For example, video encoder 200 or video decoder may refrain from applying the scaling matrices to the LFNST coded block based on the determination that scaling matrices may not be applied to the LFNST coded block. Video encoder 200 or video decoder 300 may code the video data without applying the scaling matrices to the LFNST coded block (334). For example, video encoder 200 may encode the video data without applying the scaling matrices to the LFNST coded block and video decoder 300 may decode the video data without applying the scaling matrices to the LFNST coded block.

In some examples, video decoder 300 may determine whether to process the syntax element based on at least one criteria. In some examples, the at least one criteria may be at least one of a characteristic of the LFNST coded block, a prediction mode used to code the LFNST coded block, a component of the LFNST coded block or a primary transform applied to the LFNST coded block. In some examples, the characteristic includes at least one of a block width of the LFNST coded block, a block height of the LFNST coded block, or a block aspect ratio of the LFNST coded block. In some examples, the component includes a luma component of the LFNST coded block or a chroma component of the LFNST coded block.

In other examples, video encoder 200 or video decoder 300 may determine whether scaling matrices may be applied to the LFNST coded block based on a tool used to code the LFNST coded block or a specific parameter used with the tool.

Figure 11:
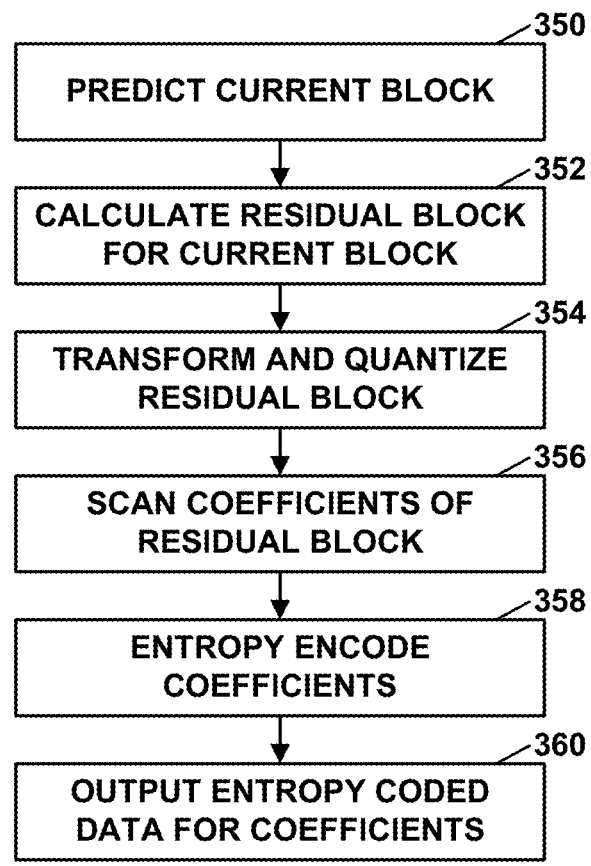
FIG. 11 is a flowchart illustrating a method for encoding video data according to the techniques of this disclosure.

FIG. 11 is a flowchart illustrating an example method for encoding a current block. The current block may comprise a current CU. Although described with respect to video encoder 200 (FIGS. 1 and 3), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). In some examples, video encoder 200 may determine a syntax element indicative of whether scaling matrices are not to be applied to low-frequency non-separable transform (LFNST) coefficients, for example by generating the syntax element indicative of whether scaling matrices are not to be applied to LFNST coefficients. Video encoder 200 may not apply the scaling matrices to the LFNST coefficients based on the syntax element indicating that the scaling matrices are not to be applied to the LFNST coefficients. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 12:
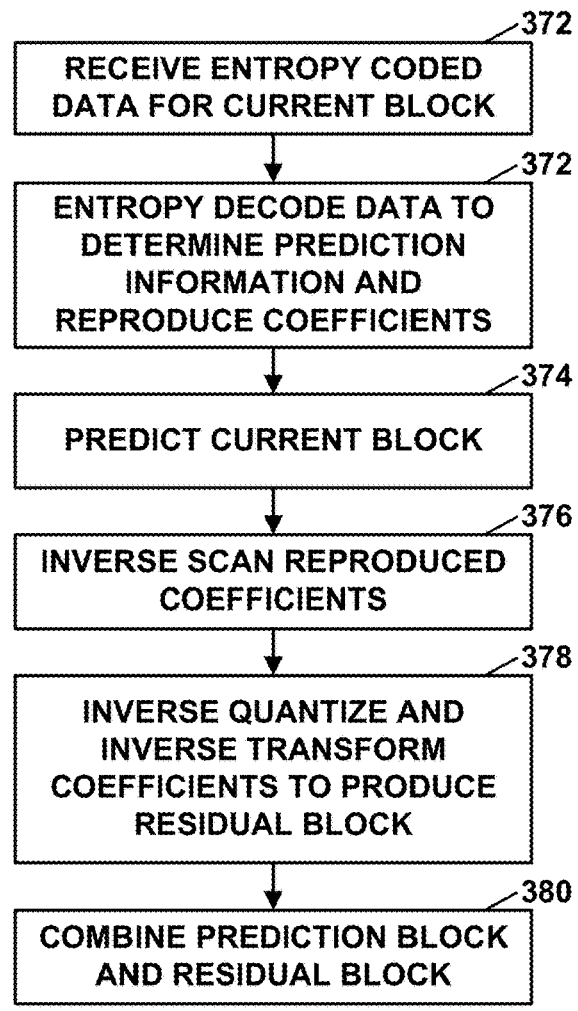
FIG. 12 is a flowchart illustrating a method for decoding video data according to the techniques of this disclosure.

FIG. 12 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 12.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). In some examples, video decoder 300 may determine a syntax element indicative of whether scaling matrices are not to be applied to LFNST coefficients. Based on the syntax element indicating that the scaling matrices are not to be applied to the LFNST coefficients, video decoder 300 may not apply the scaling matrices to the LFNST coefficients. Video decoder 300 may ultimately decode the current block by combining the prediction block and the residual block (380).

According to the techniques of this disclosure, drawbacks of using existing scaling matrices may be avoided. Additionally, coding efficiency (e.g., processing power and latency) may be improved by not applying scaling matrices when applying the scaling matrices is undesirable.

This disclosure includes the following examples.

Example 1. A method of coding video data, the method comprising: determining a syntax element indicative of whether scaling matrices are not to be applied to low-frequency non-separable transform (LFNST) coefficients; based on the syntax element indicating that the scaling matrices are not to be applied to the LFNST coefficients, not applying the scaling matrices to the LFNST coefficients; and coding the video data based on not applying the scaling matrices to the LFNST coefficients.

Example 2. The method of example 1, wherein the syntax element is signaled in a bitstream.

Example 3. The method of example 2, wherein the syntax element is signaled in one of a sequence parameter set, a picture parameter set, or an adaptation parameter set in the bitstream.

Example 4. The method of example 3, wherein the syntax element is signaled in the adaptation parameter set.

Example 5. The method of example 2, wherein the syntax element is signaled in a scaling list data syntax structure.

Example 6. The method of example 1, wherein determining the syntax element comprises deriving the syntax element.

Example 7. The method of any combination of examples 1-6, wherein the syntax element is indicative of whether scaling matrices are not to be applied to LFNST coefficients if a predetermined condition is present, wherein the predetermined condition comprises at least one of block characteristics, prediction mode used, component, or primary transform applied.

Example 8. The method of example 7, wherein the block characteristics comprise at least one of block width, block height, or block aspect ratio.

Example 9. The method of example 7 or 8, wherein the component comprises a luma component or a chroma component.

Example 10. The method of any combination of examples 1-9, wherein the syntax element is indicative of whether scaling matrices are not to be applied to LFNST coefficients based on a tool being applied to a block of the video data or a tool having a predetermined parameter being applied to the block of video data.

Example 11. The method of example 10, wherein the predetermined parameter comprises a primary transform of a non-DCT2 kernel.

Example 12. A method of coding video data, the method comprising: applying a scaling matrix corresponding to an M1×N1 transform block size to low-frequency non-separable transform (LFNST) coefficients to create scaled coefficients; and coding the video data based on the scaled coefficients.

Example 13. The method of example 12, wherein the scaling matrix corresponds to a 4×4 transform block size.

Example 14. The method of example 12, wherein values of scW and scH are dependent on block size nTbW, nTbH and lfnstIdx when LFNST is enabled.

Example 15. A method of coding video data, the method comprising: determining whether a scaling matrix for M×N is obtained by upscaling; if the scaling method is obtained by upscaling, determining whether M1 is not greater than K1 and whether N1 is not greater than K2; if M1 is not greater than K1 and N1 is not greater than K2, applying the top-left M1×N1 samples of a K1×K2 matrix to LFNST coefficients to create scaled coefficients; and coding the video data based on the scaled coefficients wherein the K1×K2 matrix is a scaling matrix used before the upscaling.

Example 16. The method of example 15, wherein no upsampling of scaling matrix coefficients is applied.

Example 17. The method of example 15, wherein if M1 is greater than K1, upsampling scaling matrix coefficients in an M1 dimension.

Example 18. The method of example 15, wherein if N1 is greater than K2, upsampling scaling matrix coefficients in an N1 dimension.

Example 19. A method of coding video data, the method comprising: applying a first quantization parameter (QP) offset to code a transform block (TB); and coding the video data based on the TB.

Example 20. The method of example 19, wherein the first QP offset is inferred to equal a value.

Example 21. The method of example 20, wherein the value is −1.

Example 22. The method of example 19, wherein the first QP offset is implicit.

Example 23. The method of example 22, wherein the first QP offset is based on block size.

Example 24. The method of example 23, wherein the first QP offset is larger for smaller block sizes.

Example 25. The method of any combination of examples 22-24, wherein the first QP offset is based on one or more of block size, intra mode, primary transform used, prediction modes used, or QP value.

Example 26. The method of any combination of examples 22-25, wherein the first QP offset is based on QP for a block, lfnstIdx and intra mode.

Example 27. The method of example 26, wherein the first QP offset is applied as a function or as a look-up table.

Example 28. The method of any combination of examples 19-27, wherein the first QP offset is signaled in a bitstream or derived by a video coder.

Example 29. The method of any combination of examples 19-28, wherein the implicit, wherein the first QP offset is not applied to all color components.

Example 30. A method of coding video data, the method comprising: applying a scaling vector of size nZ to coefficients of an LFNST block in lieu of an LFNST matrix to create scaled coefficients; and coding the video data based on the scaled coefficients.

Example 31. A method of coding video data, the method comprising: determining whether LFNST is applied to a block; if LFNST is applied, determining characteristics of the block; applying a scaling matrix or vector to the block to create scaled coefficients, the scaling matrix or vector being based on the characteristics of the block; and coding the video data based on the scaled coefficients.

Example 32. The method of example 31, wherein the characteristics of the block comprise one or more of block size, intra mode, lfnstIdx, or prediction mode.

Example 33. A method of coding video data, the method comprising: determining whether LFNST is applied to a block; if LFNST is applied, determining a scaling vector or scaling matrix based on other scaling vectors or matrices; applying the scaling vector or matrix to the block to create scaled coefficients; and coding the video data based on the scaled coefficients.

Example 34. The method of any combination of examples 12-33, wherein a scaling factor for one or more coefficients that is not specified is inferred to be equal to 0.

Example 35. A method of coding video data, the method comprising: determining if a scaling matrix can be applied to an LFNST-coded block; and coding the LFNST-coded block based on the determination.

Example 36. The method of example 35, further comprising: determining characteristics of the LFNST-coded block; and restricting application of the scaling matrix to the LFNST-coded block based upon at least one characteristic of the LFNST-coded block.

Example 37. The method of example 36, wherein the characteristics comprise one or more of block width/height/aspect ratio, prediction mode used, component, and primary transform applied.

Example 38. The method of example 35, further comprising: determining a tool used to code the video data; and restricting application of the scaling matrix to the LFNST-coded block based on the tool.

Example 39. The method of example 38, wherein the tool is a non-DCT2 kernel.

Example 40. The method of any combination of examples 1-39, wherein the method is applied to primary transform coefficients.

Example 41. The method of any of examples 1-40, wherein coding comprises decoding.

Example 42. The method of any of examples 1-41, wherein coding comprises encoding.

Example 43. A device for coding video data, the device comprising one or more means for performing the method of any of examples 1-42.

Example 44. The device of example 43, wherein the one or more means comprise one or more processors implemented in circuitry.

Example 45. The device of any of examples 43 or 44, further comprising a memory to store the video data.

Example 46. The device of any combination of examples 43-45, further comprising a display configured to display decoded video data.

Example 47. The device of any combination of examples 43-46, wherein the device comprises one or more of a camera, a computer, a mobile device, a broadcast receiver device, or a set-top box.

Example 48. The device of any combination of examples 43-47, wherein the device comprises a video decoder.

Example 49. The device of any combination of examples 43-48, wherein the device comprises a video encoder.

Example 50. A computer-readable storage medium having stored thereon instructions that, when executed, cause one or more processors to perform the method of any of examples 1-42.

Although one or more methods described above may be described with respect to a particular type of block, these methods may apply to different types of blocks, e.g., coding blocks, prediction blocks, transform blocks or other types of blocks that specify some spatial partitioning of the picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining whether scaling matrices may be applied to a low-frequency non-separable transform (LFNST) coded block of the video data;
   based on a determination that scaling matrices may not be applied to the LFNST coded block, not applying the scaling matrices to the LFNST coded block; and
   coding the video data without applying the scaling matrices to the LFNST coded block.

2. The method of claim 1, further comprising determining whether the scaling matrices may be applied to the LFNST coded block based on a syntax element received within one of a sequence parameter set, a picture parameter set, or an adaptation parameter set of a bitstream.

3. The method of claim 2, further comprising determining whether to process the syntax element based on at least one criteria.

4. The method of claim 3, wherein the at least one criteria is based on at least one of a characteristic of the LFNST coded block, a prediction mode used to code the LFNST coded block, a component of the LFNST coded block or a primary transform applied to the LFNST coded block.

5. The method of claim 4, wherein the characteristic comprises at least one of a block width of the LFNST coded block, a block height of the LFNST coded block, or a block aspect ratio of the LFNST coded block.

6. The method of claim 4, wherein the component comprises a luma component of the LFNST coded block or a chroma component of the LFNST coded block.

7. The method of claim 1, further comprising signaling, within one of a sequence parameter set, a picture parameter set, or an adaptation parameter set of a bitstream, a syntax element indicative of whether the scaling matrices may be applied to the LFNST coded block.

8. The method of claim 7, further comprising signaling the syntax element in a scaling list data syntax structure.

9. The method of claim 1, further comprising deriving a value indicative of whether scaling matrices may be applied to the LFNST coded block.

10. The method of claim 1, further comprising determining whether scaling matrices may be applied to the LFNST coded block based on a tool used to code the LFNST coded block or a specific parameter used with the tool.

11. A device for coding video data, the device comprising:
    a memory configured to store the video data; and
    one or more processors implemented in circuitry and communicatively coupled to the memory, the one or more processors being configured to:
      determine whether scaling matrices may be applied to a low-frequency non-separable transform (LFNST) coded block of the video data;
      based on a determination that scaling matrices may not be applied to the LFNST coded block, not apply the scaling matrices to the LFNST coded block; and
      code the video data without applying the scaling matrices to the LFNST coded block.

12. The device of claim 11, wherein the one or more processors are further configured to determine whether the scaling matrices may be applied to the LFNST coded block based on a syntax element received within one of a sequence parameter set, a picture parameter set, or an adaptation parameter set of a bitstream.

13. The device of claim 12, wherein the one or more processors are further configured to determine whether to process the syntax element based on at least one criteria.

14. The device of claim 13, wherein the at least one criteria is based on at least one of a characteristic of the LFNST coded block, a prediction mode used to code the LFNST coded block, a component of the LFNST coded block or a primary transform applied to the LFNST coded block.

15. The device of claim 14, wherein the characteristic comprises at least one of a block width of the LFNST coded block, a block height of the LFNST coded block, or a block aspect ratio of the LFNST coded block.

16. The device of claim 14, wherein the component comprises a luma component of the LFNST coded block or a chroma component of the LFNST coded block.

17. The device of claim 11, wherein the one or more processors are further configured to signal, within one of a sequence parameter set, a picture parameter set, or an adaptation parameter set of a bitstream, a syntax element indicative of whether the scaling matrices may be applied to the LFNST coded block.

18. The device of claim 17, wherein the syntax element is signaled in a scaling list data syntax structure.

19. The device of claim 11, wherein the one or more processors are further configured to derive a value indicative of whether scaling matrices may be applied to the LFNST coded block.

20. The device of claim 11, wherein the one or more processors are further configured to determine whether scaling matrices may be applied to the LFNST coded block based on a tool used to code the LFNST coded block or a specific parameter used with the tool.

21. The device of claim 11, wherein the device comprises a wireless communication device.

22. A non-transitory computer-readable storage medium having instructions stored thereon which, when executed by one or more processors, cause the one or more processors to:
- determine whether scaling matrices may be applied to a low-frequency non-separable transform (LFNST) coded block of the video data;
- based on a determination that scaling matrices may not be applied to the LFNST coded block, not apply the scaling matrices to the LFNST coded block; and
- code the video data without applying the scaling matrices to the LFNST coded block.

23. The non-transitory computer-readable storage medium of claim 22, wherein the instructions further cause the one or more processors to determine whether the scaling matrices may be applied to the LFNST coded block based on a syntax element received within one of a sequence parameter set, a picture parameter set, or an adaptation parameter set of a bitstream.

24. The non-transitory computer-readable storage medium of claim 22, wherein the instructions further cause the one or more processors to signal, within one of a sequence parameter set, a picture parameter set, or an adaptation parameter set of a bitstream, a syntax element indicative of whether the scaling matrices may be applied to the LFNST coded block.

25. A device for coding video data, the device comprising:
- means for determining whether scaling matrices may be applied to a low-frequency non-separable transform (LFNST) coded block of the video data;
- means for not applying the scaling matrices to the LFNST coded block based on a determination that scaling matrices may not be applied to the LFNST coded block; and
- means for coding the video data without applying the scaling matrices to the LFNST coded block.

26. The device of claim 25, further comprising means for determining whether the scaling matrices may be applied to the LFNST coded block based on a syntax element received within one of a sequence parameter set, a picture parameter set, or an adaptation parameter set of a bitstream.

27. The device of claim 25, further comprising means for signaling, within one of a sequence parameter set, a picture parameter set, or an adaptation parameter set of a bitstream, a syntax element indicative of whether the scaling matrices may be applied to the LFNST coded block.

* * * * *